Patented Sept. 19, 1950

2,522,752

UNITED STATES PATENT OFFICE 2,522,752

THIOPHENE ACYLATION WITH CATALYST OF SULFURIC ACID-CARBOXYLIC ACID COMPLEX

Thomas F. Doumani and Joseph F. Cuneo, Los Angeles, Calif., assignors to Union Oil Company of California, Los Angeles, Calif., a corporation of California No Drawing. Application February 17, 1945, Serial No. 578,566

13 Claims. (Cl. 260—329)

This invention relates to the preparation of sulfur-containing carbonyl compounds and especially to the acylation of the thiophene type or mercaptan type organic sulfur compound with an anhydride of an organic carboxylic acid in the presence of an acylation catalyst derived from concentrated sulfuric acid.

It is known that thiophene may be reacted with acetyl chloride in the presence of aluminum chloride to form acetothienone. It is also known that thiophene may be reacted with acetic anhydride in the presence of aluminum chloride to form acetothienone. In the latter reaction, however, and probably in both reactions the aluminum chloride acts not merely as a catalyst but actually takes part in the reaction and is largely destroyed thereby. Thus, at least one mol of aluminum chloride is substantially destroyed for every mol of thiophene which reacts.

It has now been discovered that thiophene and its homologs may be reacted with organic acid anhydrides to form acetothienone and similar thienyl ketones, in the presence of a small amount of a catalyst prepared by reacting concentrated sulfuric acid with at least twice the number of mols of an organic acid anhydride. The catalyst prepared in this manner is a true catalyst since only a small proportion compared to the thiophene compound is required and the catalyst is not substantially destroyed but may be employed repeatedly for additional reactions.

The structure of the catalyst of this invention is not definitely known. In the preferred method of preparation the catalyst is prepared by reacting the sulfuric acid and the organic acid anhydride for a sufficiently long time to cause the disappearance of the sulfate ion from the product as evidenced by the lack of a precipitate when the reaction product is contacted with an aqueous solution of barium chloride. It is indicated by Murray, Journal of the American Chemical Society, vol. 62, page 1230, that the product of the reaction is sulfoacetic acid in the case of acetic anhydride and that in this reaction an intermediate is formed, acetyl sulfuric acid which is in itself unstable and will hydrolyze to form sulfuric acid and acetic acid, or isomerize to the more stable sulfoacetic acid. It is believed, however, that the product of the reaction is not exclusively sulfoacetic acid or possibly even predominantly sulfoacetic acid but is more probably acetyl sulfuric acid. It may also be a complex containing sulfoacetic acid and acetic anhydride, or it may be a mixture containing acetyl sulfoacetic acid, sulfoacetic acid, the sulfoacetic acid-acetic acid complex and possibly other materials such as sulfonyldiacetate, sulfonyldiacetic acid, disulfodehydroacetic acid, and/or like compounds. The catalyst may also be used before it has entirely reacted to the point at which it ceases to show sulfate ions when tested with barium chloride solution, that is, at a point at which some acetyl sulfuric acid or even sulfuric acid itself is present in the catalyst, since these materials are also active catalysts for the reaction.

As an example of the process of this invention a catalyst was prepared by mixing 0.2 mol (10.7 ml.) of 95% sulfuric acid with 0.4 mol (37.8 ml.) of acetic anhydride and heating the resulting mixture at 80° C to 90° C. until a test portion gave no precipitate of barium sulfate with barium chloride solution. This required about ten minutes of heating.

A methyl thiophene concentrate was prepared by cracking a residual fraction from a high sulfur crude oil from Santa Maria Valley, California at about 825° F. The gasoline produced in the cracking was carefully fractionated by distillation to obtain a narrow boiling fraction in the toluene boiling range. This fraction was azeotropically distilled with methylethyl ketone to eliminate substantially all of the non-aromatic hydrocarbons and recover a concentrate boiling between about 112° C. and 113° C. This concentrate by spectrographic analysis contained 24.5% toluene. Its sulfur content was about 26.4% and substantially all of the material present other than toluene was 2-methyl thiophene.

Approximately 1 mol of methyl thiophene (133.6 ml. of the above concentrate) was added gradually to a solution of the above catalyst in one mol (94.4 ml.) of acetic anhydride, keeping the temperature between about 40° C. and 50° C. The reaction was apparently as follows:

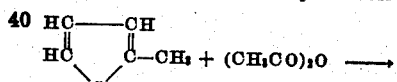

Methyl thiophene   Acetic anhydride

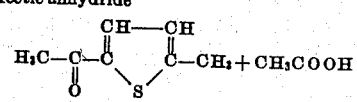

Methylacetyl thiophene   Acetic acid

The product, a homogeneous solution, was maintained at about 40° C. for an additional two hours. At this time the product was washed with water, thereby forming an aqueous phase containing the bulk of acetic acid produced and an oil phase containing the bulk of the methyl acetyl thiophene produced as in the above reaction. The oil phase was diluated with pentane and the diluted oil was washed with sodium carbonate solution and again with water to remove all traces of acetic acid, and was finally dried with sodium sulfate and distilled.

After removal of the pentane about 30 ml. of a toluene fraction containing only 3.15% sulfur was obtained and an acetyl methyl thiophene cut boiling between about 86° C. and 108° C. at 10.5 ml. pressure was obtained. About 90% of this latter fraction boiled at the boiling point of pure 2-acetyl-5-methyl thiophene. The melting points of the purest fractions in this boiling range were 22.6° to 23.0° C. and their specific gravities were 1.12 at 25° C. The yield of the methyl acetyl thiophene fraction was about 78.6% of the theoretical yield based on the acetic anhydride taken for the reaction. The methyl acetyl thiophene fraction as produced was a colorless stable liquid of very agreeable odor similar to that of acetophenone.

By similar reactions to the above, other thiophene type compounds and other anhydrides of organic acids may be reacted in the presence of the catalyst of this invention to produce analogous sulfur-containing ketones. Thus in place of methyl thiophene in the above reaction we may employ thiophene itself, and dimethyl thiophenes, ethyl thiophenes, and in general thiophenes having the formula—

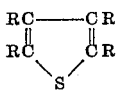

in which the R's may be the same or different and represent hydrogen or hydrocarbon groups. These hydrocarbon groups may be saturated groups such as acyclic groups namely methyl, ethyl, isopropyl, butyl and the like or cyclic saturated groups such as cyclopentyl, cyclohexyl, methyl-cyclopentyl and the like; unsaturated groups such as vinyl, propenyl, cyclohexenyl, and the like; or aromatic groups such as phenyl, benzyl, tolyl and the like. Although thiophenes having hydrogen attached to the carbon in the position alpha to the sulfur are preferred, those which have hydrocarbon groups in this position may also be employed, as shown by the fact that 2,5-dimethyl thiophene reacts almost as readily as the mono-methyl derivative of the specific example above.

Although these lower molecular weight thiophenes having less than about 8 carbon atoms are somewhat more reactive, the higher molecular weight thiophenes having 10 or 20 or more carbon atoms may also be employed. As indicated above thiophenes are present in fairly large amounts in the products obtained upon pyrolysis of high sulfur fractions from petroleum, shale, or coal distillation. In such products they are present in admixture with hydrocarbons which are predominantly unsaturated and aromatic in character. Thus by the cracking of a high sulfur crude oil and distillation of the product to yield a narrow boiling fraction in the benzene range it will be found that the benzene fraction so obtained will contain an appreciable quantity of thiophene from which it is separated only with great difficulty since the boiling points of these two materials are very close together. Similarly, as indicated in the specific example above, a toluene fraction from such a cracked product will contain a relatively large amount of methyl thiophene from which it may be separated only with difficulty. The present invention offers a very convenient method of separating these two materials since the sulfur compounds will react almost quantitatively to form ketones by the above reactions while the aromatic hydrocarbons are substantially unaffected and are thus purified. In the specific example above, the toluene concentration was increased in a single stage from a value of about 24.5% to a value of about 90%. Pure toluene, when substituted for methyl thiophene in the process of the specific example, gave no reaction.

In the above example acetic anhydride was employed. It has been found, however, that other anhydrides may also be employed. These include propionic anhydride and other acyclic saturated carboxylic acid anhydrides having the general formula

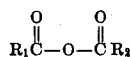

where $R_1$ and $R_2$ are alkyl groups such as methyl, ethyl, isopropyl, butyl and the like, and may be the same or different. $R_1$ and $R_2$ may also be cyclic groups such as cyclopentyl, cyclohexyl, or the corresponding groups present in naphthenic acid anhydrides.

Although the above are preferred, anhydrides of cyclic structure such as succinic anhydride and glutaric anhydride which are saturated, and have the general formula

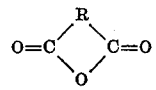

where R is an alkylene radical, may be employed. Phthalic anhydride and maleic anhydride and like anhydrides which are unsaturated or aromatic in character may also be employed.

It has also been found that in place of the above anhydrides ketene and its homologs may be employed. The relationship between ketene and acetic anhydride becomes clear when it is pointed out that both are anhydrides of acetic acid. Thus by removal of 1 mol of water from 2 mols of acetic acid, acetic anhydride is formed; and by removal of 1 mol of water from 1 mol of acetic acid ketene is formed. It is also well known that acetic anhydride is formed by the reaction between acetic acid and ketene as indicated below:

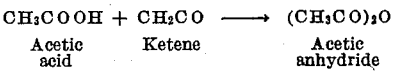

It has been found that ketene may be employed in the place of acetic anhydride in all of the above reactions. In fact the ketene provides for a more economical process in that by its use no byproduct acetic acid is formed. In the above reaction between thiophene and acetic anhydride for example, acetic acid is produced as a byproduct according to the reaction shown, whereas when ketene is employed, no byproduct is produced, the main reaction apparently proceeding as follows:

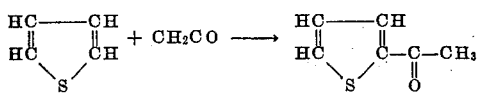

The latter reaction is preferably carried out in the presence of acetic anhydride. In this case the mechanism may be a combination of the acetic anhydride reaction shown above with simultaneous conversion of the byproduct acetic acid by means of the ketene to form additional acetic anhydride. Ketene homologs having the formula

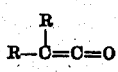

in which the R's are the same or different, and may be hydrogen (ketene itself) or an alkyl group such as methyl, ethyl and the like may be employed in place of the corresponding acid anhydride. For example, methyl ketene in which R is a methyl group may be considered the anhydride of propionic acid or propionic anhydride, and it has been found that methyl ketene can be employed in the above reactions in place of propionic anhydride. R may also be any other acyclic saturated hydrocarbon group as described above for the substituent groups on the thiophenes.

As indicated above, in the preparation of the catalyst it is preferred that the reaction between the organic acid anhydride and the sulfuric acid be continued until the product gives no test for sulfate ion, upon testing with barium chloride solution. As shown in the specific example this requires only about ten minutes at a temperature of 80 to 90° C. The preparation may be carried out at lower temperatures however if somewhat longer reaction times are allowed. At room temperature about 24 hours is required. Temperatures between about 0° C. and 100° C. may be employed. The lower temperatures such as below about 40° C. are preferred on the basis of obtaining a product of light color. At high temperatures the catalyst is rather dark in color although its activity is still excellent. In this preparation it is possible to employ molal ratios of anhydride to sulfuric acid of about 2:1 or even as low as about 1:1 in some instances, but it is preferable to employ ratios greater than about 5:1. It is believed that the most active constituent of the catalyst is acetyl sulfoacetic acid which is prepared as indicated in the following reaction.

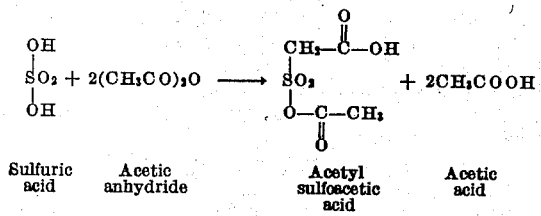

As indicated in the above reaction acetic acid is produced as a byproduct. In fact it has been observed that when a large excess of acetic anhydride is employed almost exactly two mols of acetic acid are produced for every mol of sulfuric acid reacted and about two mols of acetic anhydride are required for every mol of sulfuric acid. It is desirable to remove the byproduct acetic acid prior to the use of the catalyst in the acylation reaction. This may be done in either of two ways. It may be distilled off under vacuum, or it may be reacted with ketene to produce additional acetic anhydride. The latter method is generally preferred since it does not require the use of elevated temperatures and the acetic anhydride produced is generally beneficial for the succeeding acylation reaction. The presence of excess acetic anhydride is also beneficial in that it maintains the reaction mixture in a single homogeneous phase.

The catalyst may also be prepared by other reactions. As indicated above it may be prepared by reacting sulfuric acid with ketene. This is preferably done in the presence of acetic anhydride or acetic acid as indicated above but may also be carried out directly. It may also be prepared by reacting sulfur trioxide with acetic acid or acetic anhydride, preferably the latter. The conditions for these reactions are approximately the same as for the reaction between the sulfuric acid and acetic anhydride as indicated above. Although in this discussion of the catalyst preparation acetic anhydride acetic acid and ketene only have been referred to, the same principles apply to the preparation of catalysts from other homologs of these anhydrides and acids such as propionic anhydride, methyl ketene and the other anhydrides referred to above for the acylation process. It is preferable to employ the same anhydride in the preparation of the catalyst as that employed in the acylation reaction in which it is to be used.

The temperatures employed in the acylation reaction may also be between about 0° C. and 100° C. The proportion of anhydride relative to sulfur compound may be varied over wide limits. Where the thiophene is the more expensive commodity an excess of the anhydride should be employed in order to obtain greater yields based on the sulfur compound. Where the anhydride is the more expensive commodity an excess of the sulfur compound should be employed to improve the yield as based on the anhydride. The proportion of catalyst to be employed is preferably between about 0.1 and 0.2 mol of catalyst (calculated as acetyl sulfoacetic acid) per mol of anhydride employed, although proportions as low as 0.05 mol or less to 1.0 mol or more of catalyst per mol of anhydride may be employed. Under these conditions all of the thiophene type sulfur compounds described above may be reacted with the anhydrides described above to form sulfur ketones by reactions analogous to that shown for the specific example above.

It has also been discovered that the catalyst of this invention prepared as above is an exceptionally active catalyst for the reaction between the anhydrides shown above and another type of sulfur compound, namely mercaptans. The products of this reaction are thioesters, which are also sulfur containing carbonyl compounds of this invention. As an example of this reaction a catalyst-acetic anhydride mixture was prepared by mixing 9.95 ml. of 99.5% sulfuric acid (0.1 mol) with 113 ml. of acetic anhydride (1.2 mols) and allowing the mixture to stand over night until there was no evidence of the presence of sulfuric ions on testing with barium chloride solution. This catalyst mixture was slowly added to 111 ml. of ethyl mercaptan (1.5 mols) keeping the reaction mixture cool by immersion of the vessel in an ice bath. The reaction mixture was then refluxed for about one hour, which resulted in formation of a homogeneous solution. This solution was then cooled and washed successively with water and dilute sodium carbonate solution. The washings were extracted with commercial pentane and the pentane extract was added to the previously washed reaction product, thereby dissolving it. The thus diluted and purified reaction mixture was dried with anhydrous sodium sulfate and fractionally distilled. Four fractions were obtained in the distillation, the first being the pentane diluent, the second being unreacted ethyl mercaptan, the third being the ethyl thioacetate reaction product and the fourth being a small amount of residual material. The reaction which took place was apparently as follows:

CH₃—CH₂—SH + (CH₃—CO)₂O ⟶
Ethyl mercaptan    Acetic anhydride

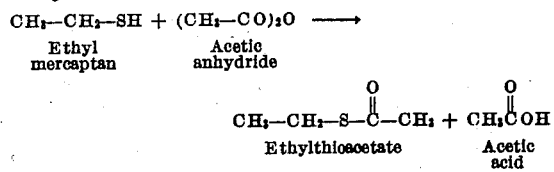

$$\text{CH}_3\text{—CH}_2\text{—S}\overset{O}{\overset{\|}{\text{—C}}}\text{—CH}_3 + \text{CH}_3\overset{O}{\overset{\|}{\text{C}}}\text{OH}$$
Ethylthioacetate    Acetic acid The ethyl thioacetate fraction amounted to about 72 ml. and the bulk of it boiled at about 116 to 117° C. which is the boiling point of the pure thio ester as reported in the literature.

The above reaction has also been carried out with other mercaptans, such as propyl mercaptan, butyl mercaptan and the like. It may be carried out with any mercaptan having the general formula RSH in which R is an alkyl or other saturated hydrocarbon radical or an unsaturated or aromatic hydrocarbon radical as described above for the thiophene type compounds. The reaction conditions such as the temperature, the proportions of reactants and catalysts are in general the same as those given above for the thiophene reaction. All of the anhydrides and ketenes given above may be employed in this reaction also. Application of the principle of the present invention to the acylation of mercaptans is disclosed and claimed in our continuation-in-part application Serial No. 60,412, filed November 16, 1948.

It has also been found that sulfur compounds other than thiophenes and mercaptans may be reacted with the anhydrides shown above in the presence of the catalyst of this invention to form sulfur containing carbonyl compounds. These include diamyl sulfide and other organic sulfides of the general formula RSR where R is a hydrocarbon substituent group, and pentamethylene sulfide and other thiophanes of the general formula (CR₂)ₙS where R is hydrogen or a hydrocarbon substituent group of the types shown above for the thiophenes, and n is an integer.

The invention may therefore be stated to reside in the reaction of sulfur compounds, particularly those of the types of thiophenes and mercaptans with organic carboxylic acid anhydrides and ketenes in the presence of sulfuric acid-organic acid anhydride catalysts prepared as above to obtain sulfur containing carbonyl compounds.

Where "concentrated sulfuric acid" is specified in the claims this may mean sulfuric acid of any concentration higher than about 50% by weight and including also fuming sulfuric acid of strength up to sulfuric anhydride itself. In general the acids preferred are between about 90% and 100% concentration since lower concentrations tend to convert excessive proportions of the anhydride to unreactive acid. Where acylation agents are specified herein, these include both the organic carboxylic acid anhydrides and ketenes.

Modifications of this invention which would occur to one skilled in the art are to be included in the scope of the invention as defined in the following claims.

We claim:

1. A process for the production of a thienyl ketone which comprises reacting a thiophene having at least one hydrogen atom attached to a carbon atom in the thiophene ring so as to permit nuclear acylation at this point with an acylation agent of the class consisting of organic carboxylic acid anhydrides and ketenes in the presence of an acylation catalyst prepared by reacting concentrated sulfuric acid with more than double its molal quantity of an acylation agent of the class consisting of organic carboxylic acid anhydrides and ketenes at a temperature between about 0° C. and 100° C. for a time sufficient to cause the disappearance of sulfate ion from the product.

2. A process according to claim 1 in which the acylation agent employed in the catalyst preparation is the same as the acylation agent employed in the reaction with the sulfur compound.

3. A process according to claim 1 in which the acylation agent employed in the catalyst preparation is an organic carboxylic acid anhydride and the acylation agent employed in the reaction with the sulfur compound is a ketene.

4. A process for the preparation of a thienyl ketone which comprises reacting a thiophene having at least one hydrogen atom attached to a carbon atom in the thiophene ring so as to permit nuclear acylation at this point with an acylation agent of the class consisting of acyclic carboxylic acid anhydrides and acyclic ketenes in the presence of an acylation catalyst prepared by reacting concentrated sulfuric acid with more than double its molal quantity of an acyclic carboxylic acid anhydride at a temperature between about 0° C. and 100° C. for a time sufficient to cause the disappearance of sulfate ion from the product.

5. A process according to claim 4 in which the anhydrides and ketenes are saturated.

6. A process for the production of a thienyl ketone which comprises preparing an acylation catalyst by reacting concentrated sulfuric acid with more than 5 times its molal quantity of an anhydride of an acyclic carboxylic acid, adding the catalyst so prepared to a thiophene having at least one hydrogen atom attached to a carbon atom in the thiophene ring so as to permit nuclear acylation at this point in the presence of an acylation agent of the class consisting of organic carboxylic acid anhydrides and ketenes, reacting the mixture at a temperature between about 0° C. and 100° C., thereby causing the acylation of the thiophene.

7. A process according to claim 6 in which sufficient anhydride is employed to obtain a homogeneous reaction mixture.

8. A process according to claim 6 in which the byproduct organic acid obtained in the catalyst preparation step is removed by distillation prior to the employment of the catalyst in the succeeding reaction.

9. A process according to claim 6 in which the byproduct organic acid produced in the catalyst preparation step is converted to additional anhydride by the addition of a ketene prior to the employment of the catalyst in the succeeding reaction.

10. A process according to claim 6 in which both the acylation agent and the anhydride employed in the catalyst preparation step are acetic anhydride.

11. A process for the preparation of a thienyl ketone which comprises reacting a thiophene having at least one hydrogen atom attached to a carbon atom in the thiophene ring so as to permit nuclear acylation at this point with a carboxylic acid anhydride in the presence of an acylation catalyst prepared by reacting concentrated sulfuric acid with more than double its molal quantity of a carboxylic acid anhydride at a temperature between about 0° C. and 100° C.

for a sufficiently long time to cause the disappearance of the sulfate ion from the product and the formation of some acyl sulfocarboxylic acid.

12. A process for the preparation of a thienyl ketone which comprises reacting a thiophene having at least one hydrogen atom attached to a carbon atom in the thiophene ring so as to permit nuclear acylation at this point with a carboxylic acid anhydride in the presence of an acylation catalyst prepared by reacting concentrated sulfuric acid with more than double its molal quantity of an acetic anhydride at a temperature between about 0° C. and 100° C. for a sufficiently long time to cause the disappearance of the sulfate ion from the product and the formation of acetyl sulfoacetic acid.

13. A process according to claim 12 in which the carboxylic acid anhydride is acetic anhydride in each instance.

THOMAS F. DOUMANI.
JOSEPH F. CUNEO.

REFERENCES CITED

The following references are of record in the file of this patent:

UNITED STATES PATENTS

| Number | Name | Date |
|---|---|---|
| 2,069,329 | Roelfsema | Feb. 2, 1937 |
| 2,315,046 | Byrns | Mar. 30, 1943 |